Oct. 28, 1969   J. B. STINSON   3,474,467
SANITARY HOLDING TANK SYSTEM

Filed April 10, 1967   2 Sheets-Sheet 1

INVENTOR.
JOSEPH B. STINSON
BY
Woodhams, Blanchard & Flynn
ATTORNEYS

Oct. 28, 1969   J. B. STINSON   3,474,467
SANITARY HOLDING TANK SYSTEM
Filed April 10, 1967   2 Sheets-Sheet 2

INVENTOR.
JOSEPH B. STINSON
BY
Woodhams, Blanchard & Flynn
ATTORNEYS

United States Patent Office 3,474,467
Patented Oct. 28, 1969

3,474,467
SANITARY HOLDING TANK SYSTEM
Joseph B. Stinson, Fremont, Ohio, assignor to The Joseph B. Stinson Company, Fremont, Ohio, a corporation of Ohio
Filed Apr. 10, 1967, Ser. No. 629,787
Int. Cl. E03d 5/01; B63b 17/06
U.S. Cl. 4—10                               7 Claims

ABSTRACT OF THE DISCLOSURE

A sanitary sewage system for pleasure boats equipped with a head in which a closed sanitary sewage holding tank has an inlet connected to the head for receiving sewage therefrom. The tank has an outlet conduit which extends to the bottom of the tank and which is connected to a suction fitting mounted on the hull of the boat. When the boat is docked, a suction pump can be connected to the fitting so that the contents of the tank can be removed and discharged into a sewage system on land. Means are provided for venting gas from the tank.

BACKGROUND OF THE INVENTION

Field of the invention

This invention relates to a sewage system for boats and, more particularly, relates to a sanitary holding tank adapted for installation in boats and which is connectible to a head or toilet, or other plumbing fixtures, for receiving waste therefrom and which can easily and conveniently be connected to a suction pump on land so that the contents of the tank can be discharged into a sewage system on land.

Description of the prior art

A variety of sewage handling devices and systems have been used in boats but none of them have been completely satisfactory. Chemical toilets are relatively expensive to install and operate and the use thereof is considered awkward and undesirable by many persons. Conventional flush-type heads or toilets are preferred but same require special plumbing arrangements for discharging the sewage. It is common to discharge the sewage directly into the water but this is undesirable because it creates a water pollution condition. The elimination of the discharge of sewage into the water will substantially reduce water pollution which is highly desirable because pollution is already a serious problem in many rivers and lakes.

Accordingly, it is an object of this invention to provide a sanitary sewage system for use in pleasure boats in which the sewage is held in a tank and the tank is provided with means whereby the sewage can be removed from the tank and discharged into a sewage system on land when the boat is docked.

It is a further object of this invention to provide a sewage system for use in pleasure boats which comprises a sanitary holding tank adapted for installation in a boat either during manufacture of the boat or afterwards, which can be connected to a head or toilet or other plumbing fixture for receiving sewage therefrom and which can be connected to a suction pump on land so that the sewage can be pumped into a land sewage system.

It is a further object of this invention to provide a sanitary sewage system which is inexpensive to manufacture and install and which is of rugged construction so it requires little or no maintenance.

Additional objects and advantages of the invention will become apparent to persons acquainted with equipment of this type upon reading the following description and inspecting the accompanying drawings, in which:

FIGURE 3 is a sectional view taken along the line III—III of FIGURE 2.

Summary of the invention

According to the invention, there is provided in combination with a boat having a head or toilet, or other plumbing fixture therein, a sewage system which comprises a sanitary holding tank mounted in the boat and having an inlet pipe connected to the toilet for receiving sewage therefrom. An outlet pipe extends substantially to the bottom of the tank and said outlet pipe is connected by a conduit to a suction pump fitting which is mounted on the deck or boat hull in a position above the waterline where it is readily accessible for connection to a suction pump on land when the boat is moored or docked. A vent pipe also communicates with the interior of the tank and it is connected by a conduit to a vent fitting mounted on the hull of the boat above the waterline and located in a position where the gases in the tank can be discharged to the atmosphere without causing annoyance to persons on the boat.

Description of the preferred embodiment

Figure 1:
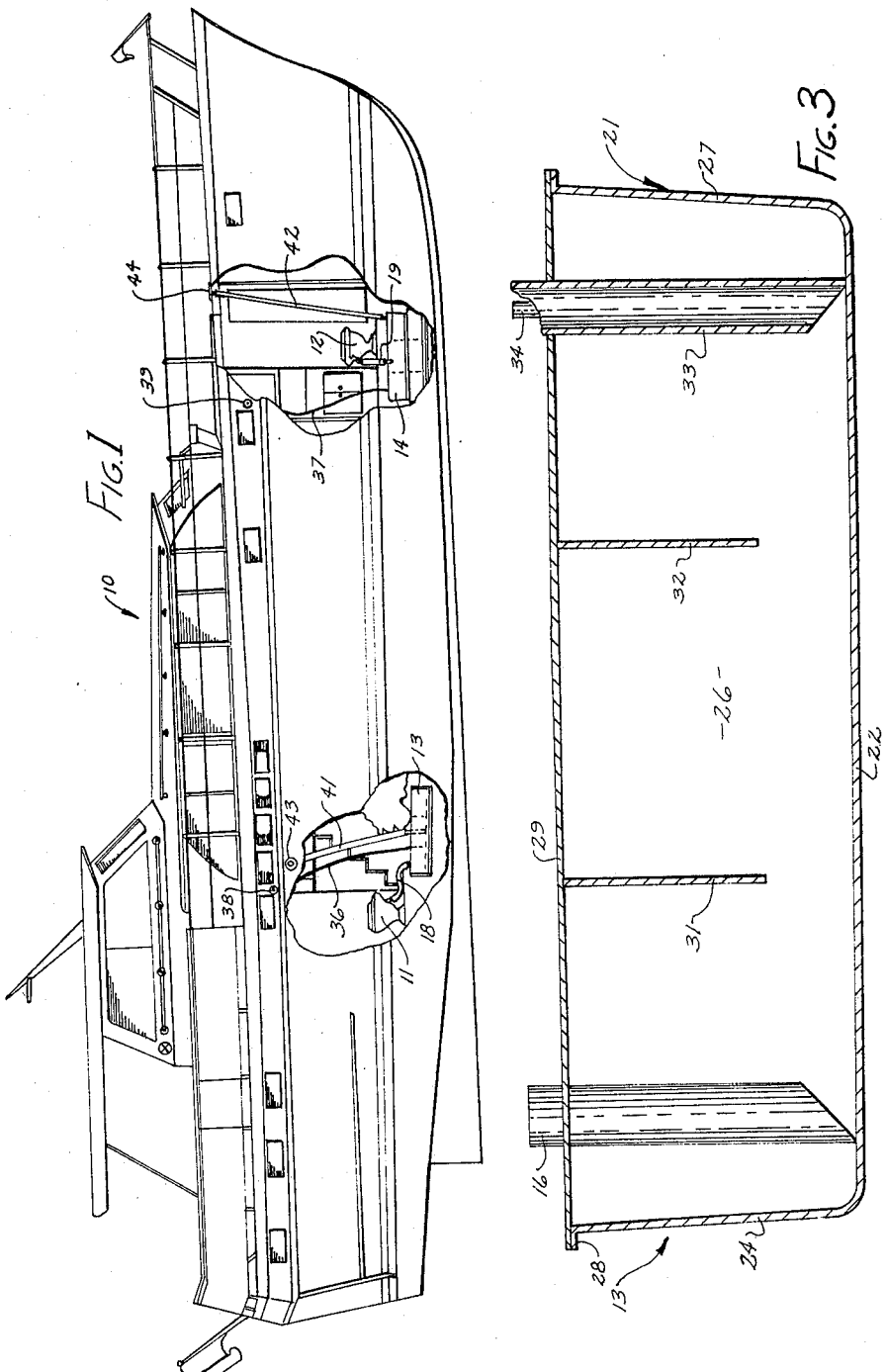
FIGURE 1 is a partially broken away, side elevational view of a pleasure boat equipped with a sewage system according to the invention.

Referring to FIGURE 1, there is illustrated a pleasure boat 10 which can be of any suitable type and which is here illustrated as being a cabin cruiser. The boat 10 is equipped with two heads or toilets 11 and 12. The toilets can be located at any suitable position within the hull of the boat and since this is determined by the boat manufacturer and forms no part of the present invention a detailed description thereof is believed to be unnecessary.

Holding tanks 13 and 14 are associated with the heads 11 and 12, respectively. The holding tanks 13 and 14 are self-contained units which can be installed in substantially horizontal positions at suitable locations within the boat hull wherever the necessary space is available, such as in the bilge, either during the original manufacture of the boat or afterwards.

The outlets of the heads 11 and 12 are connected to the upwardly extending inlet pipes 16 and 16A of the tanks 13 and 14, by suitable conduits 18 and 19, respectively.

13 and 14, by suitable conduits 18 and 19, respectively.

The conduits 18 and 19 preferably are flexible and they are made of a suitable material, such as rubber or polyvinyl chloride plastic, which is capable of handling sewage for a long period of time with deterioration. The conduits 18 and 19 can be secured to the outlets of the heads 11 and 12 and to the tank inlet pipes 16 and 16A in any suitable manner, such as by pipe clamps or couplings (not shown) of any suitable conventional type.

Figure 2:
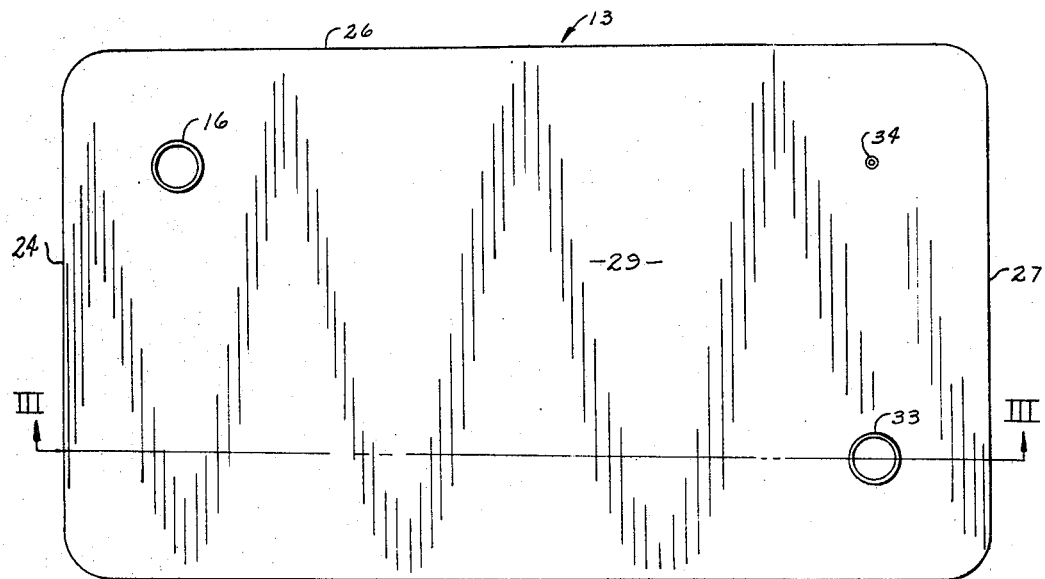
FIGURE 2 is a top plan view of a sanitary holding tank which is part of the sewage system.
Figure 4:
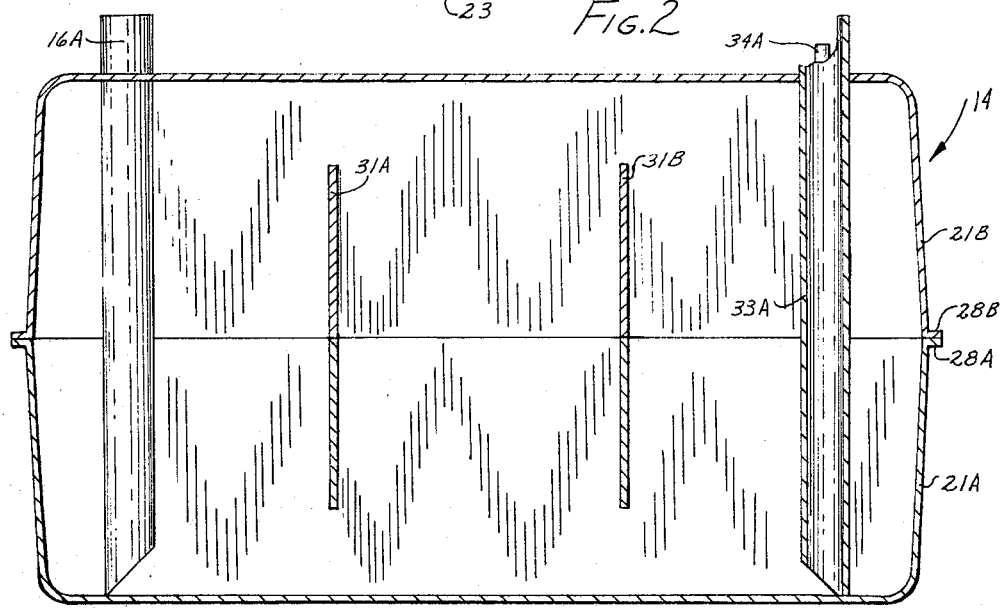
FIGURE 4 is a sectional view corresponding to FIGURE 3, but illustrating a modified tank construction.

The tank 13 is generally rectangular in plan view (FIGURE 2) and it is comprised of a one-piece cup-shaped base portion 21 having a bottom wall 22 and four upstanding side walls 23, 24, 26 and 27. A continuous marginal flange 28 extends outwardly from the coplanar upper edges of the side walls 23, 24, 26 and 27. A cover 29, which is here shown as being a flat plate or sheet, is sealed along its outer edge portion to the flange 28 and said cover closes the upper end of the base portion 21 whereby the tank 13 is sealed except for the conduits described hereinbelow.

A plurality of baffles, here two baffles 31 and 32, are secured to and extend between the side walls 23 and 26. The baffles are upright, parallel and spaced apart from each other. They extend downwardly from the upper edges of the side walls 23 and 26 and their lower edges are spaced from the bottom wall 22 so that the contents of the tank can flow thereunder. The baffles 31 and 32 minimize movement and splashing of the contents of the tank.

The upright inlet pipe 16 extends through the cover 29 and into the tank between the wall 24 and the baffle 31. The inlet pipe 16 extends substantially to the bottom of the tank and the lower end of said pipe is cut on an angle whereby the sewage can freely flow into the tank. As will be apparent, the tanks 13 and 14 are positioned below the heads 11 and 12 and are positioned as close as possible thereto in order to minimize the amount of piping required and in order to facilitate the flow of the sewage.

An upright outlet pipe 33 extends upwardly from substantially adjacent to the bottom wall 22 of the tank through and above the cover 29. The lower end of the outlet pipe 33 is cut on an angle so that the contents of the tank are drawn into the open lower end of the pipe when suction is applied to said pipe as hereinafter further described. It will be desirable to install the tank in such position that the lower wall 22 slopes at a small angle, such as about 3°, with respect to the horizontal with outlet pipe 33 being at the low end of the bottom wall to facilitate removal of the contents of the tank. The upper end of the outlet pipe 33 extends a suitable distance above the cover 29 so that a suction conduit can be connected thereto. An upright vent pipe 34 extends through the cover 29 a short distance into the tank so that its lower end is located below but is closely adjacent to the lower side of said cover. Both the outlet pipe 33 and the vent pipe 34 are here shown as extending into the tank at positions between the baffle 32 and the end wall 27. However, the inlet pipe 16, outlet pipe 33 and vent pipe 34 can be positioned at various locations on the cover 29 depending on the requirements of the particular installation involved.

The tank 14 is shown as being of a modified construction and it is comprised of two cup-shaped sections 21A and 21B which each correspond in shape to the section 21 of the tank 13 previously described. The cup-shaped sections 21A and 21B have marginal peripheral flanges 28A and 28B which are sealed to each other. Parallel upright baffles 31A and 32A are arranged in the tank 14 and they are spaced from both the upper and lower walls thereof. An inlet pipe 16A, an outlet pipe 33A and a vent pipe 34A communicate with the interior of the tank 14 in the same fashion as do the pipes 16, 33 and 34 in the tank 13. It will be apparent that the tank 14 has approximately twice the volumetric capacity of the tank 13, assuming that the sections 21A and 21B have the same volumetric capacity as section 21 of the tank 13. This arrangement makes it possible for a manufacturer of the tanks to provide tanks of two different sizes with a minimum number of different parts.

The tanks 13 and 14 can be made of any suitable corrosion resistant metal, such as stainless steel, or a suitable plastic material which is capable of holding sewage without deterioration. Where the tanks are made of metal, the parts thereof can be secured together by suitable means, such as resistant welding. When the tanks are made of plastic material, then the parts can be secured together by a suitable adhesive or solvent weld. The tanks are constructed so that they are completely sealed except for the inlet, outlet and vent pipes whereby they cannot leak and no odors can escape. The volumetric capacities of the tanks can be of any suitable values appropriate for the requirements of the particular installation involved.

The vent pipes 34 and 34A are connected by suitable conduits 36 and 37 to vent fittings 38 and 39 which are mounted on the hull of the boat above the waterline. The fittings 38 and 39 are open to the atmosphere so that gases which become present in the tanks 13 and 14 can be discharged to the atmosphere. The vent fittings 38 and 39 are located in out-of-the-way places so that the gases will not be discharged in regions where people are likely to be present frequently.

Figure 5:
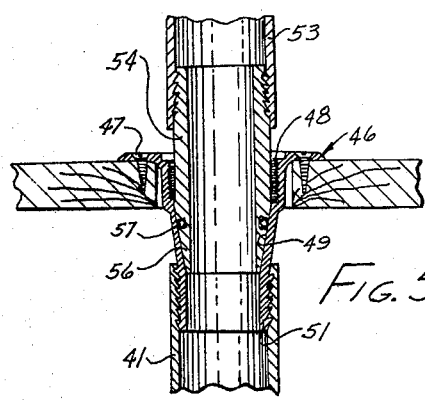
FIGURE 5 is a central sectional view of a preferred coupling structure used for connecting a suction pump to the outlet of a sanitary holding tank.

The outlet pipes 33 and 33A are connected by conduits 41 and 42 to suction pump fittings 43 and 44 which can be positioned on the deck or on the hull of the boat above the waterline. It is preferred to use a suction pump fitting as illustrated in FIGURE 5 which is comprised of a flanged body 46 secured to the boat hull by suitable means, such as screws 47 which extend through the flange thereof. The body 46 has an internally threaded recess 48 adjacent its outer end. A smooth-walled frusto-conical passage 49 extends inwardly from the inner end of the recess 48 and a cylindrical portion 51 extends inwardly from the inner end of the frusto-conical portion. The cylindrical portion 51 may be provided with external teeth 52 whereby the conduit 41 can be reliably secured thereto.

A threaded cap (not shown) can be threaded into the recess 48 in order to close same and thereby block communication with the conduit 41. This will be the normal condition except when the tank 13 is being emptied. When it is desired to remove the contents of the tank 13, the cap is removed and a conduit 53 having a coupling 54 secured thereto is connected to the conduit 41 by pressing the frusto-conical portion 56 of said coupling into tight sealing engagement with the internal wall of the frusto-conical portion 49 of the body 46. An O-ring 57 may be provided on the coupling portion 56 to improve the sealing effect.

The conduit 53 will be connected to a suction pump (not shown) of any suitable type which is capable of applying a sufficient vacuum in the conduits 53 and 41 and thus in the outlet pipe 33 in order that the contents of the tank will be removed from the tank. The contents of the tank will be transferred by the suction pump to a suitable sewage facility on shore, such as a septic tank or a city sewage system. Marinas and docks for boats will be provided with suction pumps, hoses and the appropriate fittings so that the contents of sanitary holding tanks in boats can be removed when the boats are moored thereat.

Thus, the invention provides simple, rugged and relatively inexpensive equipment for enabling sewage to be stored in boats while they are away from land. When the boat docks at a marina or other similar facility, the contents of the sanitary holding tank can be removed by connecting a suction pump on shore to the tank and the contents of the tank can then be discharged into a sewage system on land. Thus, the discharge of sewage into the water can be completely eliminated in a simple and reliable fashion. No appreciable modification of the structure of the boats will be required because the holding tanks can be placed in any suitable location where space is available. Moreover, the plumbing connections can be made easily and inexpensively. The operation of the heads or toilets is not affected and the sewage can be removed and disposed of easily and conveniently.

While preferred embodiments of the invention have been described, the invention contemplates such changes or modifications as lie within the scope of the appended claims.

The embodiments of the invention in which an exclusive property or privilege is claimed are defined as follows:

1. In combination with a boat having a toilet therein, a sewage system comprising:
   a closed tank mounted on said boat for collecting waste therein said tank having integral top and bottom wall means;

inlet means for permitting waste to be transferred from said toilet to said tank, said inlet means including an inlet pipe extending from the toilet through said top wall means and into the interior of the tank;

outlet means for permitting waste to be removed from the interior of said tank by a suction pump for discharge to a location externally of the sewage system, said outlet means including an outlet pipe having a portion thereof secured to and extending downward through said top wall means said portion of said outlet pipe having an inlet opening substantially adjacent the lower end thereof with said inlet opening communicating with the interior of said tank, and being positioned within the interior of said tank substantially adjacent said bottom wall means to facilitate the removal of waste from said tank;

said outlet means further including a suction pump fitting secured to the other end of said outlet pipe for permitting said outlet pipe to be releasably connected to a suction pump for permitting withdrawal of waste from said tank; and vent means including a vent pipe communicating at one end thereof with the interior of said tank for permitting escape of gases therefrom.

2. The combination of claim 1, in which the lower end of said portion contacts the bottom wall of said tank, said inlet opening being directed sidewardly relative to the longitudinally extending direction of said portion.

3. The combination of claim 1, in which the inlet means includes a discharge opening communicating with the interior of said tank adjacent one end thereof, the inlet opening of said outlet means communicating with the interior of said tank adjacent the other end thereof, and baffle means secured to said tank and positioned within the interior thereof between said discharge and inlet openings, said baffle means being spaced above the bottom wall of said tank for permitting flow thereunder from said discharge opening to said inlet opening, said baffle means minimizing splashing movement of the waste within said tank due to rolling or pitching movement of said boat.

4. The combination of claim 1, in which the suction pump fitting secured to the other end of said outlet pipe is secured to said boat at an elevation substantially above the elevation of said inlet opening.

5. The combination of claim 1, in which the bottom wall of the tank slopes at a small angle with respect to the horizontal, the inlet opening formed in said outlet pipe being positioned at the low end of the bottom wall to facilitate removal of waste from the tank.

6. The combination of claim 1, in which the tank is comprised of a base section and a cover which are sealed to each other, the inlet pipe, the vent pipe and the outlet pipe being mounted on and extending through the cover.

7. The combination of claim 4, in which the suction pump fitting is comprised of a tubular member affixed to the hull of the boat and being adapted for connection to a coupling capable of removably fitting within the internal opening of the fitting.

References Cited

UNITED STATES PATENTS

| | | | |
|---|---|---|---|
| 964,217 | 7/1910 | Cronk | 4—8 |
| 1,859,632 | 5/1932 | Pheteplace. | |
| 2,671,573 | 3/1954 | Hendon et al. | |
| 2,798,228 | 7/1957 | Boester | 4—10 |
| 2,806,622 | 9/1957 | Leirer. | |
| 2,865,028 | 12/1958 | Patenaude | 4—10 |
| 2,868,368 | 1/1959 | Beach. | |
| 3,040,333 | 6/1962 | Merrill | 4—8 |
| 3,318,248 | 5/1967 | Rembold | 4—10 |

FOREIGN PATENTS 530,781  12/1940  Great Britain.

LAVERNE D. GEIGER, Primary Examiner
H. K. ARTIS, Assistant Examiner

U.S. Cl. X.R.

4—8